US012668687B2

(12) United States Patent
Vervoort et al.

(10) Patent No.: US 12,668,687 B2
(45) Date of Patent: Jun. 30, 2026

(54) RECYCLED POLYMER COMPOSITIONS

(71) Applicant: Kraton Corporation, Houston, TX (US)

(72) Inventors: Freddy Vervoort, Brussels (BE); Lennaert Klerk, Amsterdam (NL); Stijn Van Averbeke, Brussels (BE); Laurens Engelen, Amsterdam (NL)

(73) Assignee: Kraton Corporation, The Woodlands, TX (US)

( * ) Notice: Subject to any disclaimer, the term of this patent is extended or adjusted under 35 U.S.C. 154(b) by 575 days.

(21) Appl. No.: 18/303,661

(22) Filed: Apr. 20, 2023

(65) Prior Publication Data

US 2023/0340241 A1 Oct. 26, 2023

Related U.S. Application Data

(60) Provisional application No. 63/363,248, filed on Apr. 20, 2022.

(51) Int. Cl.
*C08L 23/06* (2006.01)
(52) U.S. Cl.
CPC ......... *C08L 23/06* (2013.01); *C08L 2205/025* (2013.01); *C08L 2205/03* (2013.01); *C08L 2207/062* (2013.01); *C08L 2207/20* (2013.01)
(58) Field of Classification Search
CPC .............. C08L 23/06; C08L 2205/025; C08L 2205/03; C08L 2207/062; C08L 2207/20
See application file for complete search history.

(56) References Cited

U.S. PATENT DOCUMENTS

| | | | | |
|---|---|---|---|---|
| 6,040,390 A | * | 3/2000 | Ko | C08C 19/02 |
| | | | | 525/333.1 |
| 2017/0107364 A1 | * | 4/2017 | Trolez | C08L 23/06 |

FOREIGN PATENT DOCUMENTS

| | | | |
|---|---|---|---|
| DE | 202021001477 U1 | | 9/2021 |
| JP | 2003055531 A | * | 2/2003 |
| WO | 2004039875 A1 | | 5/2004 |
| WO | 2017194969 A1 | | 11/2017 |

OTHER PUBLICATIONS

English translation of JP 2003055531 (Year: 2003).*

* cited by examiner

*Primary Examiner* — Catherine S Branch
*Assistant Examiner* — Andrea Wu

(57) ABSTRACT

A recycled polymer composition is disclosed comprising: a) 80-99.5 wt. % of a post-consumer recycle polymer comprising a recycled high density polyethylene (PCR-HDPE) and a recycled polypropylene (PCR-PP); b) 0.5-20 wt. % of a styrenic block copolymer (SBC) having a block A derived from a vinyl aromatic monomer and a block B derived from a conjugated diene monomer; and c) 0-10 wt. % of at least an additive, based on total weight of the recycled polymer composition. An article obtained from the recycle polymer composition using extrusion blow molding (EBM) show improved mechanical properties including drop impact resistance and top load strengths.

20 Claims, No Drawings

RECYCLED POLYMER COMPOSITIONS

RELATED APPLICATIONS

This application claims benefit to U.S. provisional application No. 63/363,248, filed on Apr. 20, 2022, which is hereby incorporated herein by reference.

TECHNICAL FIELD

The disclosure relates to a recycled polymer composition and articles made therefrom.

BACKGROUND

Polyolefins are used for many applications in our daily life, particularly for packages. There is a growing interest in utilizing recycled polyolefins in various applications. The European Union has set a target requiring member nations to recycle at least 70% of all packaging by 2030. Plastic recycling process involves classification and sorting of waste plastics based on their types, e.g., polyethylene, polypropylene, polyesters, etc. The sorting of waste plastics can be helpful for applications where virgin polymer is generally used. However, each fraction of the recycled polymer such as polyethylene has a certain amount of contaminations, e.g., unwanted materials such as polypropylene, which can be challenging to remove to obtain a 100% pure fraction.

Recycled polymer compositions containing recycled polyolefins with such contaminations are not suitable for producing articles by certain processes, e.g., extrusion blow molding (EBM), due to lack of desired mechanical properties. In addition, recycled compositions need to have a good melt strength and high homogeneity to process through EBM.

Therefore, there is a need for a recycled polymer composition, even with undesired materials such as recycled polypropylene, with improved mechanical properties for producing articles using certain processes, such as, for example EBM.

SUMMARY

In a first aspect, the disclosure relates to a recycled polymer composition for forming articles by extrusion blow molding comprising, consisting essentially of, or consists of a) 80 to 99.5 wt. % of a post-consumer recycle polymer containing 85 to 99.5 wt. % of a recycled high density polyethylene (PCR-HDPE) and 0.5 to 15 wt. % of a recycled polypropylene (PCR-PP), based on total weight of the post-consumer recycle polymer; b) 0.5 to 20 wt. % of a styrenic block copolymer (SBC) having a block A derived from a vinyl aromatic monomer and a block B derived from a conjugated diene monomer; and c) up to 10 wt. % of at least an additive, based on total weight of the recycled polymer composition. The SBC has a polystyrene content of less than 40 wt. %, and a molecular weight ($M_p$) of less than 400 kg/mol. The article is a container obtained by extrusion blow molding from the recycled polymer composition having a height of 205 mm, a diameter of 89 mm, a wall thickness of 0.5 mm, and a volume of 1000 ml: has a top load strength at 23° C. of less than 200 N, passes a drop impact resistance test when dropped vertically at 23° C. from a height of greater than 3.0 m, and passes a drop impact resistance test when dropped vertically at 0° C. from a height of greater than 2.5 m.

In a second aspect, the container has a top load strength of 140 to 190 N.

In a third aspect, the container passes a drop impact resistance test when dropped vertically at 23° C. from a height of 3.0 to 6.5 m.

In a fourth aspect, the container passes a drop impact resistance test when dropped vertically at 23° C. from a height of 4.0 to 6.0 m.

DETAILED DESCRIPTION

The following terms will be used throughout the specification.

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C. A list of embodiments presented as "A, B, or C" is to be interpreted as including the embodiments, A only, B only, C only, "A or B," "A or C," "B or C," or "A, B, or C".

"At least one X and one Y" means there is at least one of X and there is one of Y, such as "X, X, and Y," or "X, X, X, and Y," or "X and Y" only.

"Post-industrial recycle" or PIR refers to a plastic scrap material generated from industrial processes. PIR is typically in a pre-contamination state, with known input resin type.

"Post-consumer recycle" or PCR or PCR material or PCR polymer or PCR resin can be used interchangeably with "recycled composition", "recycled polymer", "waste polymer", "recycled resin" which includes PIR, different PIR, PIR from different sources, regrind PCR, different PCR, PCR from different sources, recyclate, and mixtures thereof. PCR does not include, or is to the exclusion of, virgin polymer.

"Virgin polymer" refers to an as-is-produced polymer, not yet processed and/or not yet formed into articles for end-use applications in industry or by consumers. The virgin polymer can include additives which are commonly used in the preparation of the virgin polymer.

"Vinyl content" refers to the content of a conjugated diene monomer that is polymerized via 1,2-addition in the case of butadiene, or via 3,4-addition in the case of isoprene, resulting in a monosubstituted olefin, or vinyl group, adjacent to the polymer backbone. Vinyl content can be measured by nuclear magnetic resonance spectrometry (NMR).

"Molecular weight" or Mw refers to the styrene equivalent molecular weight in kg/mol of a polymer block or a block copolymer. Mw can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. Mw of polymers measured using GPC so calibrated are styrene equivalent molecular weights or apparent molecular weights. Mw expressed herein is measured at the peak of the GPC trace—and commonly referred to as styrene equivalent "peak molecular weight," designated as $M_p$.

"Extrusion blow molding" or EBM refers to a process of making plastic article, where plastic is melted and extruded into a hollow tube (a parison). This parison is then captured by closing into a metal mold. Air and/or suitable gas is then blown into the parison, inflating into the shape of a hollow bottle, container, or part. After the plastic has cooled sufficiently, the mold is opened, and the part is ejected.

The disclosure relates to an article obtained from a recycled polymer composition containing a post-consumer recycle polymer (PCR-polymer) and a styrenic block copolymer (SBC). An article obtained by extrusion blow molding (EBM) from such composition shows excellent mechanical properties, e.g., drop impact resistance, top load strength, etc.

(Recycled Polymer Composition)

The recycled polymer composition, based on total weight of the composition, comprises: (a) 80-99.5 wt. % of a PCR polymer, (b) 0.5-20 wt. % of a SBC, (c) up to 10 wt. % of at least an additive; alternatively, (a) 85 to 99 wt. % of a PCR polymer, (b) 1 to 15 wt. % of a SBC, (c) up to 10 wt. % of at least an additive.

(PCR-Polymer)

PCR polymer can be from industrial or consumer sources, e.g., food packaging, consumer packaging, blow molded bottles, film, syringe cases, intravenous bags, tubing, tube fittings, etc. PCR polymer can contain impurities along with PCR-HDPE and PCR-PP. Impurities include any material present from polyolefin's original use, e.g., fillers, pigments, dyes, stabilizers, flame retardants, other polymers, surfactants, antioxidants, plasticizers, UV absorbers, fibers, adhesives, adhesion promotors, flow modifiers, ink, odor-causing agents, and the like. Examples of other polymers as impurities include polybutylene (PB), polyisobutylene (PIB), ethylene propylene rubber, polyvinylchloride (PVC), polybutadiene, polyisoprene, polydicyclopentadiene (PDCPD), EPDM rubber, low density polyethylene (LDPE), linear low density polyethylene (LLDPE), very low density polyethylene (VLDPE), medium density polyethylene (MDPE), high molecular weight polyethylene (HMWPE), and ultra-high molecular weight polyethylene (UHMWPE), and mixtures thereof.

The original source (virgin polymers before recycling) for the PCR-HDPE can be any of fossil-based, or bio-based, or mixture thereof. In embodiments, the PCR polymer containing the PCR-HDPE is bio-based.

The PCR polymer comprises, consists essentially of, or consists of: 85-99.5, or 88-99, or 90-98, or 94-99.5 wt. % of a recycled high density polyethylene (PCR-HDPE), and 0.5-15, or 1-12, or 2-10, or 0.5-6 wt. % of a recycled polypropylene (PCR-PP), based on total weight of the PCR polymer.

In embodiments, the PCR polymer comprises PCR-HDPE obtained from recycled articles, e.g., containers, bottles, etc., and PCR-PP from other sources, e.g., caps of containers.

In embodiments, the PCR-HDPE has a $M_p$ of 5-2000, or 10-1000, or 20-800, or 50-500, or 100-400, or 200-300 kg/mol.

In embodiments, the PCR polymer has a density of >0.93, or >0.94, or >0.95, or 0.93-0.97, or 0.935-0.965 g/cm$^3$, measured according to ASTM D 792.

In embodiments, the PCR polymer is a regenerated resin (granulated with additives after remelting processes).

In embodiments, the PCR polymer is used in amounts of 80-99.5, 85-99, or 88-99, 90-99.5 wt. %, based on total weight of the recycled polymer composition.

(Styrenic Block Copolymer (SBC))

The SBC can be any of a linear, branched, or radial block copolymer, having at least a block A derived from a vinyl aromatic monomer and at least a block B derived from a conjugated diene monomer. In embodiments, the SBC is partially, selectively, or fully hydrogenated.

In embodiments, the SBC has a general configuration selected from: A-B, A-B-A, A-B-B', A-B-B'-A, A-B-A-B'-A, A-B-B', A-B-B'-A, A-B-A-B'-A, (A-B)$_n$X, (A-B-A)$_n$X, (A-B-B')$_n$X, (A-B-B'-A)$_n$X, (A-B-A-B'-A)$_n$X, (A-B-B')$_n$X, D-B-A, D-A-B, D-B-A-B-D, D-A-B-A-D, (D-B-A)$_n$X, (D-A-B)$_n$X, (D-B-A)$_n$X, (D-A-B)$_n$X, A-B-X$_m$-(B-A)$_n$, and mixtures thereof, X is a residue of a coupling agent, and n is a positive integer from 2-30. Block A is derived from a vinyl aromatic monomer, and blocks B and B' are same or different and derived from conjugated diene monomer. Block D comprises a segment selected from the group of polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof.

In embodiments, the vinyl aromatic monomer is selected from the group consisting of styrene, alpha-methylstyrene, methyl styrene, para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, dimethyl styrene, halogenated styrene, methoxy styrene, acetoxy styrene, vinyl toluene, isomers of vinyl toluene, vinyl xylene, 1,1-vinyl biphenyl, vinyl naphthalene, vinyl anthracene, and mixtures thereof.

In embodiments, the conjugated diene monomer is selected from the group consisting of 1,3-butadiene, isoprene, 2,3-dimethyl-1,3-butadiene, 1-phenyl-1,3-butadiene, 1,3-pentadiene, 1,3-hexadiene, 3-butyl-1,3-octadiene, myrcene, farnesene, 1,3-cyclohexadiene, piperylene, and mixtures thereof.

In embodiments, para-substituted styrene monomer is selected from the group consisting of para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, and mixtures thereof.

The vinyl aromatic monomer can be introduced or copolymerized into the conjugated diene block by any order and in any distribution. In embodiments, block B comprises at least one of 1,3-cyclohexadiene, butadiene and isoprene block polymers, wherein the polybutadiene, polyisoprene, and polycyclohexadiene blocks are optionally hydrogenated.

In embodiments, block A constitutes from 30-70, or 35-65, or 40-60, or 30-55, or 40-70 wt. %; block B constitutes from 30-70, or 35-65, or 40-60, or 30-55, or 40-70 wt. %; and block D, if present, constitutes from 20-60, or 25-55, or 30-50, or 20-45, or 35-60 wt. %, based on total weight of the SBC.

Examples of SBCs include styrene-butadiene (SB), styrene-butadiene-styrene (SBS), styrene-isoprene (SI), styrene-isoprene-styrene (SIS), styrene-isoprene/butadiene (S-I/B), styrene-isoprene/butadiene-styrene (SIBS), styrene-butadiene/styrene (S-B/S), styrene-butadiene/styrene-styrene (S-B/S-S), styrene-isoprene/styrene (S-I/S), styrene-isoprene/styrene-styrene (S-I/S-S), styrene-ethylene/butylene-styrene (SEBS), styrene-ethylene/butylene (SEB), styrene-ethylene-propylene-styrene (SEPS), styrene-ethylene/ethylene/propylene-styrene (SEEPS), styrene-ethylene/butylene/styrene-styrene (SE/B/SS), styrene-isoprene-butadiene-isoprene-styrene (SIBIS), poly(p-tert-butylstyrene-b-styrenesulfonate-b-p-tert-butylstyrene), poly[tert-butylstyrene-b-(ethylene-alt-propylene)-b-

5

(styrenesulfonate)-b-(ethylene-alt-propylene)-b-tert-butylstyrene, and mixtures thereof.

In embodiments, the SBC is mixture of two or more of a diblock, a triblock, a tetrablock, or a pentablock copolymers. In embodiments, the diblock constitutes from 20-80, 30-70 wt. %, the triblock constitutes from 20-80, or 30-70 wt. %, the tetrablock constitutes from 0-70 wt. % and the pentablock constitutes from 0-70 wt. %, based on total weight of the SBC.

In embodiments, block A derived from the polymerized vinyl aromatic monomer is essentially left non-hydrogenated and block B based on the polymerized conjugated diene monomer is hydrogenated. In embodiments, block A has a hydrogenation level of <30, or <20, or <10, or <5 mol %, based on total mol of the polymerized vinyl aromatic monomer in block A. In embodiments, block B has a hydrogenation level of >70, or >80, or >90, or >95, or >98, or >99 mol %, based on total mol of the polymerized conjugated diene monomer in block B. The hydrogenation level refers to the % of original unsaturated bonds which become saturated upon hydrogenation, which can be determined using UV-VIS spectrophotometry and/or proton NMR and/or via ozonolysis titration.

In embodiments, the SBC is a hydrogenated or unhydrogenated block copolymer comprising 1,3-cyclohexadiene monomer (CHD). In embodiments, the SBC comprising CHD has a general configuration selected from: E-B", (E-B")$_n$X, E'-B", (E'-B")$_n$X, E-B"-E, E'-B"-E', E-B"-E', E-B"-C', and mixtures thereof, where n is an integer from 2-30, and X is a residue of a coupling agent. Each block E is derived from a cyclodiene monomer. Each block E' is a poly(1,3-cyclodiene-co-vinyl aromatic) random copolymer. Each block B" is a poly(acyclic conjugated diene) polymer comprising polymerized units of at least one acyclic conjugated diene. In embodiments, block B" is hydrogenated. Each block C is a poly(vinyl aromatic) polymer. Each block E, E' and C independently has a M$_p$ of 2-60, or 2.5-50, or 3-30 kg/mol. Each block B" has a M$_p$ of 1-180, or 2-160, or 2.5-75, or 3-50 kg/mol.

In embodiments, the SBC has a residual unsaturation of 0.5-25, or 0.5-2, or 1-18, or 2-15 or <25, or <15, or <5, or >0.5, or >1, or >2 meq/g.

In embodiments, the SBC further modified by graft-reacting with a functional group, chemically attached to either the polymerized vinyl aromatic unit in block A or the polymerized conjugated diene unit in block B. Examples of functional groups include amino, phosphino, epoxies, anhydrides, silanes, acrylates, hydroxy, carboxylic acids/salts, sulfonic acid, phosphate, phosphine oxide, phosphoric acid, alkoxide, nitrile, thioether, thiol, silicon or boron containing compounds, maleic acid, fumaric acid, itaconic acid, citraconic acid, maleic anhydride, itaconic anhydride, citraconic anhydride, and allylsuccinic anhydride.

In embodiments, block A has a M$_p$ of 1-100, or 5-90, or 10-80, or 20-60 kg/mol. In embodiments, block B has a M$_p$ of 5-120, 10-100, or 20-80, or 20-60 kg/mol. block D, if present, has a M$_p$ of 10-80, or 15-70, or 20-60, or 25-55 kg/mol.

In embodiments, the SBC has a M$_p$ of <400, or <300, or 10-400, or 20-350, or 30-300, or 50-300, or 30-350, or 30-250 kg/mol.

In embodiments, the SBC has a polystyrene content (PSC) of <50, or <45 or 15-50, 5-45, or 5-50, or 10-45, or >5 wt. %, based on total weight of the SBC.

In embodiments, the SBC is added in amounts of 0.5-20, or 1-15, or 1-12, or 0.5-10 wt. % the SBC, based on total weight of the recycled polymer composition.

6

(Optional Additives)

In embodiments, the recycled polymer composition further comprises at least an additive selected from the group consisting of activators, curing agents, stabilizers, neutralizing agents, thickeners, coalescing agents, slip agents, release agents, antimicrobial agents, antioxidants, antiozonants, color change pH indicators, plasticizers, tackifiers, film forming additives, dyes, pigments, UV stabilizers, UV absorbers, catalysts, fillers, redox couples, fibers, flame retardants, viscosity modifiers, wetting agents, deaerators, toughening agents, adhesion promoters, colorants, heat stabilizers, lubricants, flow modifiers, drip retardants, anti-blocking agents, antistatic agents, processing aids, stress-relief additives, blowing agents, weld line strength promoter, and mixtures thereof.

In embodiments, a blowing agent is added to the recycled polymer composition upon decomposing at polymer processing temperature, releasing blowing gases, e.g., N$_2$, CO, CO$_2$, etc. Examples of physical blowing agents include chlorofluorocarbons, propane, n-butane, isobutane, n-pentane, isopentane, cyclopentane, n-hexane, isohexane, cyclohexane, ethanol, and methanol, and gases such as nitrogen, carbon dioxide, carbon monoxide, etc. Examples of chemical blowing agents include toluenesulfonyl hydrazine, oxydibenzenesulfonyl hydrazide, diphenyl oxide-4, 4'-disulfonic acid hydrazide, nitrates, azodicarbonamide, cyanovaleric acid, azobis(isobutyronitrile), and N-nitroso compounds. Examples of inorganic chemical blowing agents include sodium hydrogen carbonate (sodium bicarbonate), sodium carbonate, potassium bicarbonate, potassium carbonate, ammonium carbonate, and the like, which can be used alone or in combination with weak organic acids, such as citric acid, lactic acid, acetic acid, or mixtures thereof.

The blowing agent can be used alone or in combination with at least one nucleating agent, e.g., carbon black, graphite, talc, silica, TiO$_2$, calcium carbonate, amides, amines and/or esters of a saturated or unsaturated aliphatic (C$_{10}$-C$_{34}$) carboxylic acid, etc.

In embodiments, additives used is in amounts of 0-10, or 0.1-10, or 0.5-5 or >0.1, or <10 wt. %, based on total weight of the recycled polymer composition.

In embodiments, the recycled polymer composition further comprises virgin HDPE, which is fossil-based, biobased, or mixtures thereof, in amounts of up to 75, or 1-50, or 5-40, or 10-60, or 5-50, or >10, or <70 wt. % based on total weight of the recycled polymer composition.

(Preparation of Recycled Polymer Composition)

In embodiments, the recycled polymer composition is prepared by any process, e.g., compounding, dry blending, etc. In embodiments, the recycled polymer composition is compounded by mixing all components of the composition for extrusion at suitable temperature, thereafter, cooling and pelletizing for subsequent use. The compounding is achieved by any conventional compounding operation, e.g., single and twin screw extruders, mixers, and the like. The mixing temperatures are chosen in such a way that an intimate blend of components is obtained and maintained after cooling. Typical temperatures are above the softening or melting points of at least one of the components.

In embodiments, a recycled polymer composition is obtained by dry blending or compounding components in an extruder at a temperature of 380-460° F., or 390-450° F., or 400-440° F., forming pellets. A parison is formed from the pellets followed by extrusion blow molding to obtain articles, e.g., containers.

(Properties of Recycled Polymer Composition)

Articles made from the recycled polymer composition shows excellent mechanical properties, optical properties, less stiffness loss, high melt strength, improved drop impact resistance and top load strengths, reduced defects which are otherwise observed for articles made from recycled polymer compositions without the SBC.

In embodiments, a recycled polymer composition containing 0.5-20 wt. % SBC and 80 to 99.5 wt. % PCR polymer containing up to 15 wt. % of a recycled polypropylene (based on total weight of the PCR) has a notched Izod impact of 2-10, or 2.5-9.5, or 3-9, or 3.5-8.5, or 4-8 J/cm, measured according to ASTM D256.

In embodiments, the recycled polymer composition has a flexural modulus of 0.3-1.8, or 0.35-1.7, or 0.4-1.6, or 0.5-1.5, or 0.6-1.4, or 0.7-1.3 GPa, measured according to ASTM D790.

In embodiments, the recycled polymer composition has an impact strength of 10-100, or 15-90, or 20-80, or 25-70, or 30-65 kJ/m², measured according to ISO 8256 method A.

In embodiments, the recycled polymer composition has a tensile strength at yield of 10-40, or 12-38, or 15-35, or 18-32, or 20-30, or 21-29 MPa, measured according to ASTM D638.

In embodiments, the recycled polymer composition has an elongation at yield 5 mm/min) of <300%, or <280%, or <260%, or <240%, <220%, or <200%, or >50%, measured according to ASTM D638.

In embodiments, the recycled polymer composition has a melt flow rate (MFR) at 230° C. with 5 kg load of 0.1-7.5, or 0.25-7, or 1-6.5, or 1.5-6, or 2-5, <1, or <2, or <3 g/10 min, measured according to ISO 1133.

In embodiments, the recycled polymer composition has a melt strength, measured as the plateau force (cN) at 190° C. of >2, or >3, or >4, or >5, or >7, or >10, or >15, or 1-40, or 5-30, or 8-25 cN, measured according to ISO 16790.

In embodiments, the recycled polymer composition has a melting temperature ($T_m$) of 110-160° C., or 115-155° C., or 120-140° C., or 122-135° C.

Extrusion blow molded articles obtained from the recycled polymer composition are characterized as having excellent properties, e.g., top load strength and drop impact resistance.

An extrusion blow molded container formed from the recycled polymer composition having a height of 205 mm, a diameter of 89 mm, a wall thickness of 0.5 mm, and a volume of 1000 ml, when tested, exhibited at least one of the following properties:

a top load strength at 23° C. of <200 N, or <190 N, or <180 N, or 130-200 N, or 140-190 N, 145-185 N (top load strength is measured as a force maximum (Fmax) required for deformation of the container);

passing a drop impact resistance test when dropped vertically at 23° C. from a height of >3.0 meter, or >3.2 meter, or >3.5 meter, or 3.0-6.5 meter, or 3.2-6.2, or 3.5-6.0 meter, or 4.2-6.2 meter, or 4.0-6.0 meter; and passing a drop impact resistance test when dropped vertically at 0° C. from a height of >2.5 meter, or >2.6 meter, or >2.8 meter, or 2.5-6.0 meter, or 3.0-5.9, or 3.2-5.8 meter.

(End-Use Applications/Articles)

The recycled polymer composition in either pellet or parison form can be used to form articles by any of injection blow molding, injection molding, extrusion blow molding (EBM), coextrusion molding, cast film extrusion, blown film extrusion, injection stretch blow molding, rotational molding, thermoforming, thermos-fusion, foam blow molding, pultrusion, calendaring, additive manufacturing, or other known processing methods. Articles made exhibit durability, texturable, versatility, waterproof, resistant to temperature changes, resistant to atmospheric changes, high mechanical resistance, chemical resistance to certain solvents, and electric current.

In embodiments, the recycled polymer composition is used for forming hollow container by EBM. Articles can be formed by either continuous extrusion blow molding or by intermittent EBM. EBM can be carried out in a single stage, i.e., the molten recycled polymer composition exiting from the extruder is put directly into the form of the parison. The latter is then directly blow molded, in line with the extruder used for feeding of the recycled polymer composition. Examples of hollow articles include bottles, containers, fuel tanks, drums, etc. Other molded articles include furniture, signage, wheels, toys, gardening products, etc.

In embodiments, articles obtained from the recycled polymer composition are without visual seam or weld lines defects. For use as containers, the article has sufficient strength under load and does not break or show leakage.

In embodiments, the container made from the parison is of any size and shape, show uniform surface without any visual flow lines or melt fracture. The container can have a volume of <10,000 liter, or >1000 liter, or >500 liter, or >100 liter, or >50 liter, or >20 liter, or >10 liter, >5 liter, or >2 liter, or >1 liter, or >0.5 liter, or >0.3 liter, or >0.1 liter. The container wall thickness depends on the container volume, with a wall thickness ranging from 0.1-10 mm, or 0.2-8 mm, or 0.5-5 mm, or 0.8-4 mm, or 1-3 mm.

In embodiments, the container obtained from the recycled polymer composition by using EBM, has a blow-up value (BUR) of 1.1-7, or 1.2-6, or 1.5-5, or 1.8-4.5, or >1.5, or >2, or >3. The BUR is defined as:

$$BUR = \frac{\text{Inside largest diameter of blow mold}}{\text{Parison outer diameter}}$$

In embodiments, the container has a structure with one, or two, or three, or more layers.

EXAMPLES

The following examples are intended to be non-limiting.

(Production of Container)

Containers of 1 liter volume and a weight of ~32 g were prepared on a 3-layer extrusion blow molding machine. Extruder temperature was set to 180° C. on all 3 extruders which ran with same material with 33-33-34 wt. % distribution. Mould temperature was 12° C.

(Drop Impact Resistance Test)

Drop impact resistance tests were performed for sealed containers filled with water. The height range of the instrument was set between 0.5 m to 5.8 m. Each container filled with water at a temperature of 23° C. has a weight of about 1080 g (container+water). 20 containers from each composition were dropped one-by-one from the drop plate from a height between 1.0 m to 5.8 m. All containers before dropping were positioned the same on the drop plate and dropped from 1.0 m to 6.0 m. The drop plate consists of two metal plates and containers were then moved up to a desired height. For the drop impact resistance test, two metal plates will move to horizontal positions (away from each other) and the container is released to drop between two metal plates. Each container after drop was examined to determine defects. If the container does not show failure, will be dropped again with an increased height of 0.5 m from the previous dropped height. The dropping cycle is repeated with each increased height of 0.5 m until there is failure. After examining the defect (or failure) in the container due to drop, the respective height was recorded for each container. The starting height and end height (where the container showed failure mode) is the drop impact resistance of the respective container which is an average of 20 containers from each composition.

(Top Load Test)

Top load tests were performed using a compression test by Zwick Z100 universal testing machine with 2.5 kN load cell. The test speed was set to 10 mm/min at 23° C. and force maximum recorded (Fmax) at which a clear deformation was observed. Fmax is an average of 5 containers from each composition.

The components used in examples include:

SBC-1 is a hydrogenated linear tri-block copolymer based on styrene and ethylene/butylene with 15% PSC.

SBC-2 is an unhydrogenated linear tri-block copolymer of styrene and butadiene with 30% PSC.

SBC-3 is an unhydrogenated radial tri-block copolymer of styrene and butadiene with 23% of PSC, CE of 84%, and vinyl content of 9.0 wt. %.

SBC-4 is a linear unhydrogenated triblock copolymer (SIBS) of styrene, isoprene and butadiene (styrene-isoprene/butadiene-styrene) with 19% of PSC, and CE of 75%.

SBC-5 is a hydrogenated linear tetra-block copolymer of styrene, isoprene and butadiene (styrene-isoprene-styrene-isoprene) tetrablock copolymer, with 21% of PSC.

SBC-6 is a hydrogenated triblock copolymer of styrene and ethylene/butylene with 19% of PSC, CE of 93%, and vinyl content of 78 wt. %.

SBC-7 is a linear hydrogenated triblock copolymer of styrene and ethylene/butylene with 13% of PSC, CE of 93%, and vinyl content of 79 wt. %.

SBC-8 is a linear triblock copolymer of styrene-ethylene/butylene-styrene (SEBS) with 30% of PSC, and CE of 30%.

Virgin high density polyethylene (v-HDPE) (Rigidex HD 5502S) from Ineos.

Virgin polypropylene (v-PP) (HF955M) from *Borealis*.

Irganox 1010 is an antioxidant.

Irgafos 168 is a processing stabilizer.

Examples 1-6

Mixtures of v-HDPE, v-PP, antioxidant, and processing stabilizer were prepared by dry blending and compounded by using a twin screw extruder at 390-450° F. Details of compositions are provided in table 1. Containers were prepared from examples 1-6 and manual assessment of the quality and strength of containers was carried out by stretching and bending of each container. The average drop height of each example is shown in Table 1. The top load test of each container shown in table 1 in terms of Fmax at which a clear deformation was observed.

TABLE 1

|  | Example-1 | Example-2 | Example-3 | Example-4 | Example-5 | Example-6 |
|---|---|---|---|---|---|---|
| v-HDPE | 97.7 | 98.7 | 97.7 | 94.7 | 89.7 | 79.7 |
| v-PP | — | 1.0 | 2.0 | 5.0 | 10.0 | 20.0 |
| Irganox 1010 | 0.2 | 0.2 | 0.2 | 0.2 | 0.2 | 0.2 |
| Irgafos 168 | 0.1 | 0.1 | 0.1 | 0.1 | 0.1 | 0.1 |
| Average drop height of container (in meter), measured at 23° C. | 5.3 | 5.2 | 4.2 | 3.5 | 2.2 | 1.6 |
| Failure location at 23° C. | Bottom | Bottom | Bottom | Bottom | Bottom | Bottom |
| Fmax (N), measured at 23° C. | 190 | 187 | 180 | 180 | 208 | 260 |

Examples 7 to 51

Recycled polyolefin compositions were prepared by repeating procedure of examples 1-6 to resemble the recycled polymer composition (which contains certain amounts of PP along with HDPE) and adding different amounts of SBCs as shown in tables 2, 3, 4, 5, and 6. Average drop height and Fmax are reported in tables 2, 3, 4, 5, and 6 for containers obtained from respective compositions.

TABLE 2

|  | Example-7 | Example-8 | Example-9 | Example-10 | Example-11 | Example-12 | Example-13 | Example-14 | Example-15 |
|---|---|---|---|---|---|---|---|---|---|
| PCR-Polymer (PCR-HDPE 95 wt. % + PCR-PP 5 wt. %) | 100 | 98.9 | 98.9 | 98.9 | 98.9 | 98.9 | 98.9 | 98.9 | 98.9 |
| SBC-1 | — | 1 |  |  |  |  |  |  |  |
| SBC-2 | — |  | 1 |  |  |  |  |  |  |
| SBC-3 |  |  |  | 1 |  |  |  |  |  |
| SBC-4 |  |  |  |  | 1 |  |  |  |  |
| SBC-5 |  |  |  |  |  | 1 |  |  |  |
| SBC-6 |  |  |  |  |  |  | 1 |  |  |

TABLE 2-continued

| | Example-7 | Example-8 | Example-9 | Example-10 | Example-11 | Example-12 | Example-13 | Example-14 | Example-15 |
|---|---|---|---|---|---|---|---|---|---|
| SBC-7 | | | | | | | | 1 | |
| SBC-8 | | | | | | | | | 1 |
| Irganox 1010 | | 0.03 | 0.03 | 0.03 | 0.03 | 0.03 | 0.03 | 0.03 | 0.03 |
| Irgafos 168 | | 0.07 | 0.07 | 0.07 | 0.07 | 0.07 | 0.07 | 0.07 | 0.07 |
| Average drop height of container (in meter), measured at 23° C. | 4.5 | 5.2 | 5.3 | NH | 5.0 | 5.3 | 5.3 | 1.7 | 5.1 |
| Failure location at 23° C. | Bottom | Bottom | Bottom | — | Bottom | Bottom | Bottom | Bottom | Bottom |
| Average drop height of container (in meter), measured at 0° C. | 3.5 | 3.0 | 3.6 | NH | 3.4 | 5.0 | 3.8 | 4.1 | 4.0 |
| Failure location at 0° C. | Bottom | Bottom | Bottom | — | Bottom | Bottom | Bottom | Bottom | Bottom |
| Fmax (N), measured at 23° C. | 170 | 162 | 169 | — | 167 | 171 | 167 | 163 | 171 |

NH: No homogenous composition.

TABLE 3

| | Example-16 | Example-17 | Example-18 | Example-19 | Example-20 | Example-21 | Example-22 | Example-23 | Example-24 |
|---|---|---|---|---|---|---|---|---|---|
| PCR-Polymer (PCR-HDPE 95 wt. % + PCR-PP 5 wt. %) | 100 | 94.9 | 94.9 | 94.9 | 94.9 | 94.9 | 94.9 | 94.9 | 94.9 |
| SBC-1 | | 5 | | | | | | | |
| SBC-2 | | | 5 | | | | | | |
| SBC-3 | | | | 5 | | | | | |
| SBC-4 | | | | | 5 | | | | |
| SBC-5 | | | | | | 5 | | | |
| SBC-6 | | | | | | | 5 | | |
| SBC-7 | | | | | | | | 5 | |
| SBC-8 | | | | | | | | | 5 |
| Irganox 1010 | | 0.03 | 0.03 | 0.03 | 0.03 | 0.03 | 0.03 | 0.03 | 0.03 |
| Irgafos 168 | | 0.07 | 0.07 | 0.07 | 0.07 | 0.07 | 0.07 | 0.07 | 0.07 |
| Average drop height of container (in meter), measured at 0° C. | 3.5 | 4.7 | 4.1 | NH | 4.3 | 5.3 | 3.9 | 5.6 | 3.6 |
| Failure location at 0° C. | Bottom | Neck | Bottom | — | Bottom & Neck | Bottom | Bottom | Neck | Bottom |
| Fmax (N), measured at 23° C. | 170 | 158 | 153 | — | 157 | 153 | 153 | 146 | 158 |

NH: No homogenous composition.

TABLE 4

| | Example-25 | Example-26 | Example-27 | Example-28 | Example-29 | Example-30 | Example-31 | Example-32 | Example-33 |
|---|---|---|---|---|---|---|---|---|---|
| PCR-Polymer (PCR-HDPE 95 wt. % + PCR-PP 10 wt. %) | 100 | 98.9 | 98.9 | 98.9 | 98.9 | 98.9 | 98.9 | 98.9 | 98.9 |
| SBC-1 | — | 1 | — | — | — | — | — | — | — |
| SBC-2 | — | — | 1 | — | — | — | — | — | — |
| SBC-3 | — | — | — | 1 | — | — | — | — | — |
| SBC-4 | — | — | — | — | 1 | — | — | — | — |
| SBC-5 | — | — | — | — | — | 1 | — | — | — |
| SBC-6 | — | — | — | — | — | — | 1 | — | — |
| SBC-7 | — | — | — | — | — | — | — | 1 | — |
| SBC-8 | — | — | — | — | — | — | — | — | 1 |
| Irganox 1010 | — | 0.03 | 0.03 | — | 0.03 | 0.03 | 0.03 | 0.03 | 0.03 |
| Irgafos 168 | — | 0.07 | 0.07 | 0.07 | 0.07 | 0.07 | 0.07 | 0.07 | 0.07 |
| Average drop height of container (in meter), measured at 23° C. | 3.3 | 4.6 | 2.2 | NH | 4.0 | 3.8 | 3.8 | 2.5 | 2.1 |
| Failure location at 23° C. | Bottom | Neck | Neck | — | Neck | Neck | Neck | Neck | Bottom & Neck |
| Fmax (N) at 23° C. | 192 | 183 | 186 | — | 182 | 184 | 185 | 176 | 178 |

NH: No homogenous composition.

TABLE 5

| | Example-34 | Example-35 | Example-36 | Example-37 | Example-38 | Example-39 | Example-40 | Example-41 | Example-42 |
|---|---|---|---|---|---|---|---|---|---|
| PCR-Polymer (PCR-HDPE 95 wt. % + PCR-PP 10 wt. %) | 100 | 97.4 | 97.4 | 97.4 | 97.4 | 97.4 | 97.4 | 97.4 | 97.4 |
| SBC-1 | | 2.5 | | | | | | | |
| SBC-2 | | | 2.5 | | | | | | |
| SBC-3 | | | | 2.5 | | | | | |
| SBC-4 | | | | | 2.5 | | | | |
| SBC-5 | | | | | | 2.5 | | | |
| SBC-6 | | | | | | | 2.5 | | |
| SBC-7 | | | | | | | | 2.5 | |
| SBC-8 | | | | | | | | | 2.5 |
| Irganox 1010 | | 0.03 | 0.03 | 0.03 | 0.03 | 0.03 | 0.03 | 0.03 | 0.03 |
| Irgafos 168 | | 0.07 | 0.07 | 0.07 | 0.07 | 0.07 | 0.07 | 0.07 | 0.07 |
| Average drop height of container (in meter), measured at 23° C. | 3.3 | 4.3 | 4.5 | NH | 4.2 | 4.5 | 4.2 | 2.6 | 2.75 |
| Failure location at 23° C. | Bottom | Neck | Neck | Neck | Neck | Neck | Neck | Neck | Neck |
| Fmax (N), measured at 23° C. | 192 | 186 | 183 | — | 174 | 186 | 172 | 176 | 177 |

NH: No homogenous composition.

TABLE 6

| | Example-43 | Example-44 | Example-45 | Example-46 | Example-47 | Example-48 | Example-49 | Example-50 | Example-51 |
|---|---|---|---|---|---|---|---|---|---|
| PCR-Polymer (PCR-HDPE 95 wt. % + PCR-PP 10 wt. %) | 100 | 94.9 | 94.9 | 94.9 | 94.9 | 94.9 | 94.9 | 94.9 | 94.9 |
| SBC-1 | | 5 | | | | | | | |
| SBC-2 | | | 5 | | | | | | |
| SBC-3 | | | | 5 | | | | | |
| SBC-4 | | | | | 5 | | | | |
| SBC-5 | | | | | | 5 | | | |
| SBC-6 | | | | | | | 5 | | |
| SBC-7 | | | | | | | | 5 | |
| SBC-8 | | | | | | | | | 5 |
| Irganox 1010 | | 0.03 | 0.03 | 0.03 | 0.03 | 0.03 | 0.03 | 0.03 | 0.03 |
| Irgafos 168 | | 0.07 | 0.07 | 0.07 | 0.07 | 0.07 | 0.07 | 0.07 | 0.07 |
| Average drop height of container (in meter), measured at 23° C. | 3.3 | 5.7 | 5.0 | NH | 5.6 | 4.5 | 4.7 | 4.8 | 3.9 |
| Failure location at 23° C. | Bottom | Neck | Neck | — | Bottom | Bottom | Neck | Neck | Neck |
| Fmax (N), measured at 23° C. | 192 | 171 | 175 | — | 174 | 170 | 168 | 163 | 170 |

NH: No homogenous composition.

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "includes" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. The recitation of a genus of elements, materials, or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. A container obtained by extrusion blow molding from a recycled polymer composition, the recycled polymer composition comprising:

a) 80 to 99.5 wt. % of a post-consumer recycle polymer containing 85 to 99.5 wt. % of a recycled high density polyethylene and 0.5 to 15 wt. % of a recycled polypropylene, based on total weight of the post-consumer recycle polymer;

b) 0.5 to 20 wt. % of a styrenic block copolymer having a block A derived from a vinyl aromatic monomer and a block B derived from a conjugated diene monomer, wherein the styrenic block copolymer has:

a polystyrene content of less than 45 wt. %, and a molecular weight ($M_p$) of less than 400 kg/mol; and c) up to 10 wt. % of at least an additive, based on total weight of the recycled polymer composition; and wherein the container has a wall thickness of 0.1 to 10 mm and is characterized as:

having a top load strength at 23° C. of less than 200 N, passing a drop impact resistance test when dropped vertically at 23° C. from a height of greater than 3.0 m, and passing a drop impact resistance test when dropped vertically at 0° C. from a height of greater than 2.5 m.

2. The container of claim 1, wherein the container has a top load strength of 140 to 190 N.

3. The container of claim 1, wherein the container passes a drop impact resistance test when dropped vertically at 23° C. from a height of 3.0 to 6.5 m.

4. The container of claim 1, wherein the container passes a drop impact resistance test when dropped vertically at 23° C. from a height of 4.0 to 6.0 m.

5. The container of claim 1, wherein the container passes a drop impact resistance test when dropped vertically at 0° C. from a height of 2.5 to 6.0 m.

6. The container of claim 1, wherein the container passes a drop impact resistance test when dropped vertically at 0° C. from a height of 3.2 to 5.8 m.

7. The container of claim 1, wherein the recycled polymer composition comprises:

a) 85 to 99 wt. % of the post-consumer recycle polymer containing 90 to 98 wt. % of the recycled high density polyethylene and 2 to 10 wt. % of the recycled polypropylene, based on total weight of the post-consumer recycle polymer; and b) 1 to 15 wt. % of the styrenic block copolymer, based on total weight of the recycled polymer composition.

8. The container of claim 1, wherein the recycled high density polyethylene has a molecular weight ($M_p$) of 5 to 2000 kg/mol and a density of greater than 0.93 g/cm³.

9. The container of claim 1, wherein the styrenic block copolymer has a general configuration selected from: A-B, A-B-A, A-B-B', A-B-B'-A, A-B-A-B'-A, A-B-B'-A, A-B-A-B'-A, (A-B)$_n$X, (A-B-A) nX, (A-B-B')$_n$X, (A-B-B'-A)$_n$X, (A-B-A-B'-A)$_n$X, D-B-A, D-A-B, D-B-A-B-D, D-A-B-A-D, (D-B-A)$_n$X, (D-A-B)$_n$X, (D-A-B)$_n$X, A-B-X$_m$-(B-A)$_n$, and mixtures thereof, X is a residue of a coupling agent, and n is a positive integer from 2-30; and wherein each block A is derived from a vinyl aromatic monomer selected from the group consisting of styrene, alpha-methylstyrene, methyl styrene, para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, dimethyl styrene, halogenated styrene, methoxy styrene, acetoxy styrene, vinyl toluene, isomers of vinyl toluene, vinyl xylene, 1,1 vinyl biphenyl, vinyl naphthalene, vinyl anthracene, and mixtures thereof;

each block B and B' is same or different and derived from a conjugated diene monomer, selected from the group consisting of 1,3-butadiene, isoprene, 2,3-dimethyl-1, 3-butadiene, 1-phenyl-1,3-butadiene, 1,3-pentadiene, 1,3-hexadiene, 3-butyl-1,3-octadiene, myrcene, farnesene, 1,3-cyclohexadiene, piperylene, and mixtures thereof; and each block D is derived from a para-substituted styrene monomer.

10. The container of claim 9, wherein the para-substituted styrene monomer is selected from the group consisting of para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene, and mixtures thereof.

11. The container of claim 9, wherein the block A constitutes from 30 to 70 wt. %, the block B constitutes from 30 to 70 wt. %; and the block D, if present, constitutes from 20 to 60 wt. %, based on total weight of the styrenic block copolymer.

12. The container of claim 1, wherein the block A has a hydrogenation level of less than 30 mol %, based on total mol of the polymerized vinyl aromatic monomer in the block A; and the block B has a hydrogenation level of >70 mol %, based on total mol of the polymerized conjugated diene monomer in the block B.

13. The container of claim 1, wherein the styrenic block copolymer has a polystyrene content of 10 to 45 wt. %, based on total weight of the styrenic block copolymer.

14. The container of claim 1, wherein the styrenic block copolymer has a molecular weight ($M_p$) of 30 to 300 kg/mol.

15. The container of claim 1, wherein the additive is selected from the group consisting of curing agents, stabilizers, slip agents, release agents, antimicrobial agents, antioxidants, antiozonants, color change pH indicators, plasticizers, tackifiers, dyes, pigments, UV stabilizers, UV absorbers, catalysts, fillers, flame retardants, viscosity modifiers, toughening agents, heat stabilizers, lubricants, flow modifiers, drip retardants, antistatic agents, processing aids, stress-relief additives, blowing agents, weld line strength promoter, and mixtures thereof.

16. The container of claim 15, wherein the additive is present in an amount of 0.1 to 10 wt. %, based on total weight of the recycled polymer composition.

17. The container of claim 1, wherein the recycled polymer composition further comprises a virgin high density polyethylene in an amount of 1 to 50 wt. %, based on total weight of the polymer components in the recycled polymer composition.

18. The container of claim 1, wherein the recycled polymer composition is prepared by a dry blending process or a compounding process.

19. The container of claim 18, wherein the recycled polymer composition is prepared by a dry blending process at a temperature of 380 to 460° F.

20. The container of claim 1, wherein the recycled polymer composition has a melt flow rate at 230° C. with 5 kg load of 0.1 to 7.5 g/10 min, measured according to ISO 1133.

* * * * *